May 26, 1925.
M. D. GLASSBROOKE
BLOW-OUT PATCH
Filed Nov. 19, 1924
1,539,663
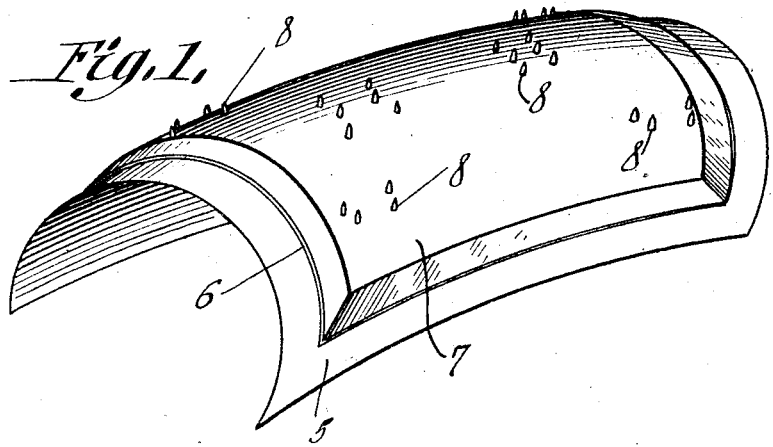
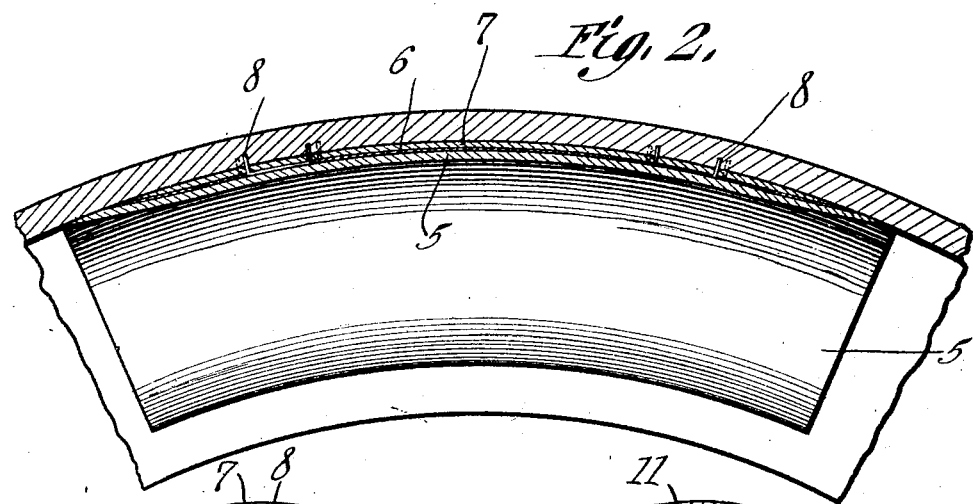
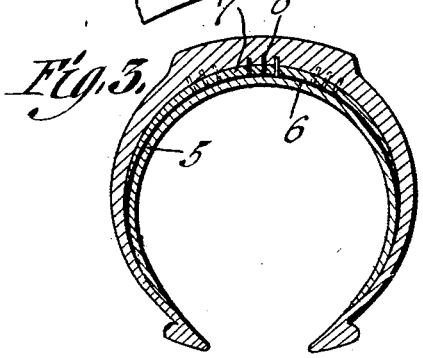
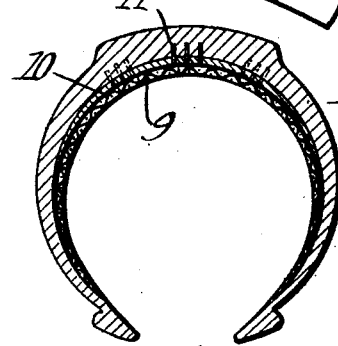
Inventor
M. D. Glassbrooke
By C. A. Snow & Co.
Attorneys Patented May 26, 1925.

1,539,663

UNITED STATES PATENT OFFICE.

MYRON D. GLASSBROOKE, OF FRESNO, CALIFORNIA.

BLOW-OUT PATCH.

Application filed November 19, 1924. Serial No. 750,831.

*To all whom it may concern:*

Be it known that I, MYRON D. GLASSBROOKE, a citizen of the United States, residing at Fresno, in the county of Fresno and State of California, have invented a new and useful Blow-Out Patch, of which the following is a specification.

This invention relates to tire boots commonly known as blow-out patches, the primary object of the invention being to provide a blow-out patch wherein the body portion thereof is constructed of leather, such as rawhide, to withstand the air pressure at the point of rupture of a tire.

Another important object of the invention is to provide a boot of this character having means to pierce the tire shoe at its thickest or tread portion, to secure the boot against movement within the shoe.

A still further object of the invention is to position the securing members with such respect to the tire that they will not move from their positions within the shoe of the tire when the tire bends under inflation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a perspective view of a boot constructed in accordance with the invention.

Figure 2 is a longitudinal sectional view through the boot.

Figure 3 is a transverse sectional view illustrating the relation of the spurs with respect to the tread of a tire shoe.

Figure 4 is a modified form of the invention wherein the inner section of the shoe is constructed of fabric material.

Referring to the drawing in detail, the reference character 5 indicates the body portion of the boot which is constructed preferably of leather and as shown, the leather is pressed into shape to conform to the curvature of an inner tube, over which the same is positioned.

Mounted on the body portion 5 is a rubber section 6 which is cemented in position to act as a base for the outer section 7 of the boot which is also constructed of leather pressed or otherwise shaped to conform to the curvature of the tire in which it is positioned.

This outer section 7 is supplied with spurs indicated at 8 which are arranged with such respect to the boot, that they will lie in planes just above the line of curvature of the shoe or casing in which the device is positioned, so that when the tube over which the boot is placed, is inflated, the bending of the casing or tire shoe will not cause the shoe or casing to pull away from the boot.

Cement or other suitable adhesive material is employed for securing the outer section 7 to the section 6, the sections 5 and 6 acting to guard the heads of the spurs against contact with the inner tube on which the boot is placed.

After the sections of the boot have been positioned, the edges of the boot are beveled to provide feather edges and insure against the tube being pinched adjacent to the ends of the boot.

In the form of the invention as illustrated by Figure 4 of the drawing, the base of the boot includes a layer of fabric indicated at 9 and an outer section 10, of suitable leather, the spurs 11 being positioned in the outer section 10 so that the heads thereof will lie between the sections 9 and 10.

A suitable adhesive material is employed for securing the sections 9 and 10 together. From the foregoing it will be obvious that due to the fact that the tested strength of leather is equal to the strength of six layers of fabric commonly employed in boot construction, the present invention sets forth an exceptionally strong construction which is comparatively light.

While I have shown and described a blow-out patch or boot provided with securing members, it is to be understood that the securing means may be eliminated and the patch be used in a tire shoe and held against movement by frictional contact.

I claim:—

A boot of the class described comprising a base section constructed of leather, an outer section constructed of leather, a layer of rubber disposed between the sections and secured to the sections, and spurs extending through the outer section and adapted to pierce the inner surface of a tire shoe in which the boot is positioned.

In testimony that I claim the foregoing as my own, I have hereto affixed my signature in the presence of two witnesses.

MYRON D. GLASSBROOKE.

Witnesses:
J. D. ROMANO,
BEN DRENTH.